United States Patent [19]

Hubert

[11] Patent Number: 4,544,175
[45] Date of Patent: Oct. 1, 1985

[54] TRUCK TRACTOR TOWING APPARATUS

[76] Inventor: Alvin I. Hubert, 176 S. State St., Sparta, Mich. 49345

[21] Appl. No.: 537,802

[22] Filed: Sep. 30, 1983

[51] Int. Cl.⁴ .............................................. B60D 1/00
[52] U.S. Cl. .................................... 280/402; 414/563
[58] Field of Search ......................... 280/402; 414/563

[56] References Cited

U.S. PATENT DOCUMENTS

| | | | |
|---|---|---|---|
| 1,851,349 | 3/1932 | Cowles | 280/402 |
| 4,047,733 | 9/1977 | Parkes | 280/402 |
| 4,149,643 | 4/1979 | Skala et al. | 414/563 |
| 4,152,006 | 5/1979 | Dunlap | 280/402 |
| 4,214,771 | 7/1980 | Mason | 280/402 |

Primary Examiner—Joseph F. Peters, Jr.
Assistant Examiner—Kenneth R. Rice
Attorney, Agent, or Firm—Price, Heneveld, Huizenga & Cooper

[57] ABSTRACT

The specification discloses an apparatus for easily and rapidly, yet securely, interconnecting two truck tractors by their fifth wheels to enable one tractor to tow the other tractor. More particularly the apparatus includes a beam fixedly secured to the towed tractor and a ramp secured to the towing tractor. The beam is slidably supported on the ramp so that the towed tractor rear wheels can be raised for towing by backing the towing tractor toward the towed tractor causing the ramp to lift the beam.

14 Claims, 6 Drawing Figures

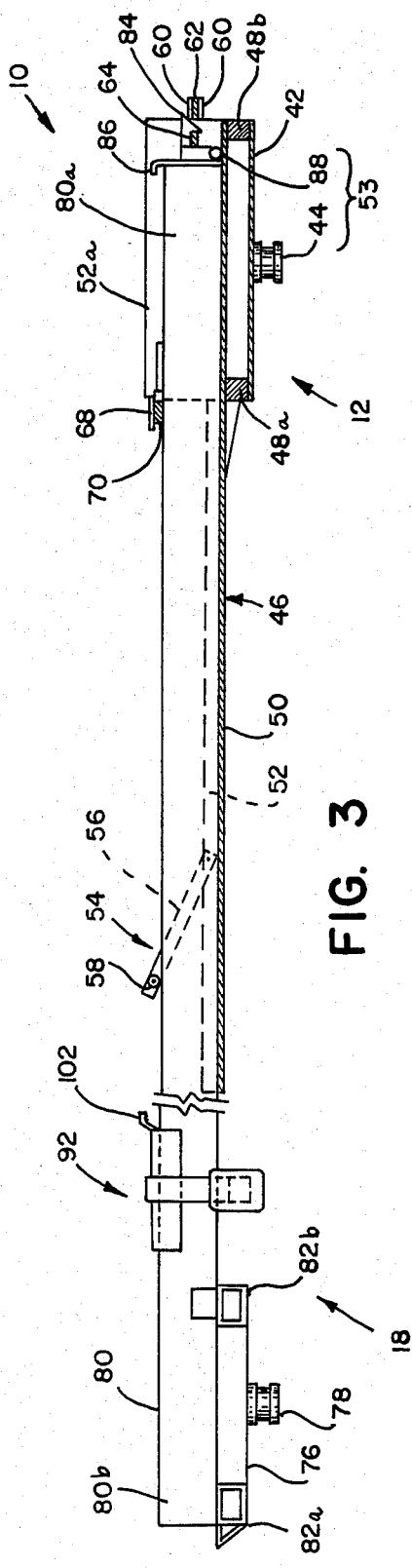
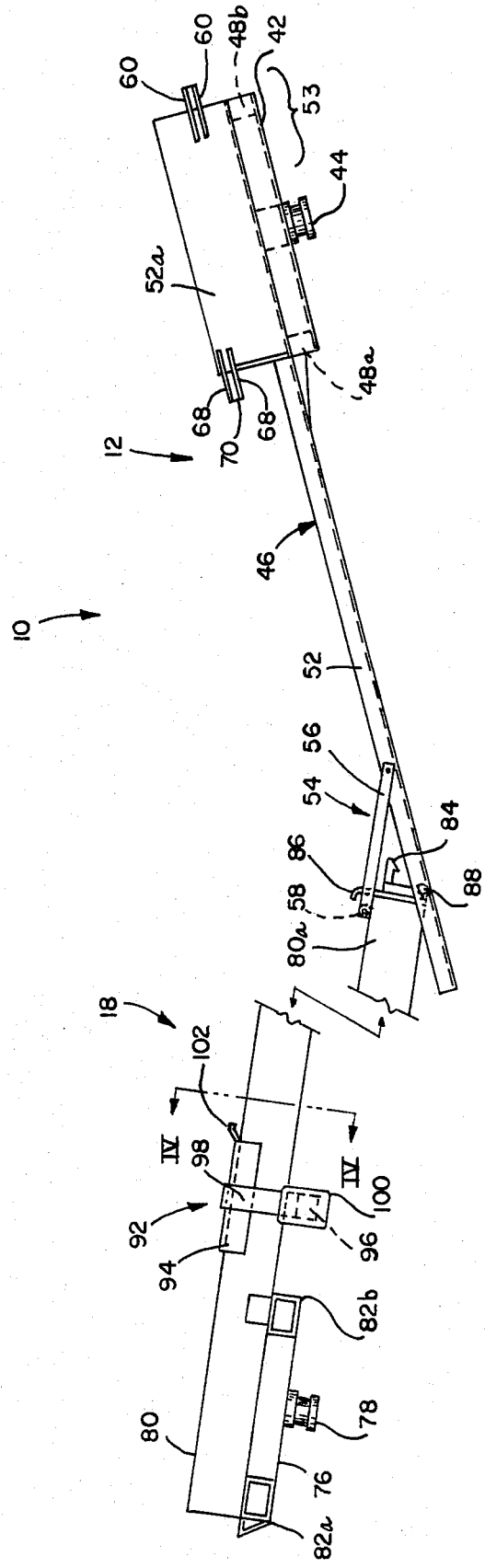

TRUCK TRACTOR TOWING APPARATUS

BACKGROUND OF THE INVENTION

The present invention relates to truck equipment, and more particularly to a device for interconnecting two truck tractors for towing.

Much to the consternation of truck drivers, a disabled semi tractor on the side of the road is not an uncommon sight. When the disabled tractor is pulling a trailer, two problems arise—first, timely delivery of the trailer and cargo and, second, transportation of the disabled tractor to a garage for repairs. The trailer can be relatively easily continued on its journey by reconnecting the trailer to a replacement tractor which continues to the trailer destination. However, the problem of transporting the disabled tractor to a garage can be difficult, dangerous, and/or expensive.

Several alternatives exist for towing the disabled vehicle. First, the tractor can be towed using a conventional tow truck. However, this is relatively expensive and requires equipment which the average trucker or small fleet operator does not typically possess. Second, the tractor can be pulled by another tractor using chains. However, this is dangerous and requires at least two men—one in each cab. Third, the disabled tractor can be rigidly interconnected to a towing tractor by a variety of devices, any of which enables the rescue tractor to lift and tow the disabled tractor.

The tractor interconnecting devices previously developed are not without their drawbacks. One example is illustrated in U.S. Pat. No. 4,047,733, entitled FIFTH WHEEL CARRIER HOIST, and issued Sept. 13, 1977, to Parkes. This device includes a jacking assembly pivotally connected to the towing truck and a beam pivotally connected at one end to the towed truck and at its opposite end to the jacking assembly. The jack can be actuated to lift the beam and raise the rear wheels of the towed truck off the ground, enabling the towing vehicle to tow the towed vehicle. This mechanism is relatively complicated. Further, the device is relatively time consuming to operate because of the need to raise and lower the towed vehicle by jacking.

Another inter-truck connecting device is illustrated in U.S. Pat. No. 4,149,643; entitled TRUCK TOW LIFT; and issued Apr. 17, 1979, to Skala et al. This device includes a beam extending between the fifth wheels of the towing and towed vehicles and supporting a hoist connectable to the frame of the towed vehicle. The rear wheels of the towed vehicle are raised and lowered by actuating the hoist, enabling the vehicle to be towed by raising the frame upwardly against the beam. This device is also relatively complicated and time consuming to operate because of the heavy-duty hoist.

SUMMARY OF THE INVENTION

The aforementioned problems are solved by the present invention wherein a towing device is provided for simply and rapidly, yet securely, interconnecting two truck tractors by their fifth wheels enabling one vehicle to tow the other vehicle. More particularly, the device basically includes two assemblies—namely, a ramp assembly secured to the fifth wheel of the towing vehicle and a beam assembly fixedly secured to the fifth wheel of the towed vehicle. The ramp is free to pivot with the towing vehicle fifth wheel, while the beam is maintained in fixed relationship to the towed vehicle. Both the ramp and the beam extend rearwardly and downwardly from their respective tractors, and the beam is slidably supported on the ramp. Therefore, the rear wheels of the towed vehicle can be lifted from the ground for towing by backing the towing vehicle toward the towed vehicle, forcing the ramp to slidably lift the beam and towed tractor connected thereto.

In a preferred embodiment of the invention, the ramp includes portions both forward and rearward of the towing fifth wheel pivot axis. The beam first travels up the rear ramp portion during lifting of the towed truck and then passes into the forward ramp portion. The passage of the beam over center of the fifth wheel pivot causes the ramp and fifth wheel to pivot so that the ramp rear portion swings upwardly against the beam. This automatic stowage of the ramp eliminates the necessity of jacking a portion of the apparatus into a towing position.

The method of interconnecting two vehicles using the present device is a further aspect of the invention. This method includes (1) securing the ramp to the towing vehicle fifth wheel; (2) securing the beam to the towed vehicle fifth wheel; (3) positioning the beam on the ramp for sliding movement; and (4) backing the towing vehicle toward the towed vehicle to lift the towed vehicle for transportation.

These and other objects, advantages, and features of the invention will be more readily understood and appreciated by reference to the detailed description of the preferred embodiment and the drawings.

BRIEF DESCRIPTION OF THE DRAWINGS

FIG. 3 is a side elevational view of the apparatus in the towing position with the ramp assembly partially broken away;

FIG. 4 is a side elevational view of the apparatus in its lowered position;

DETAILED DESCRIPTION OF THE PREFERRED EMBODIMENT

Figure 1:
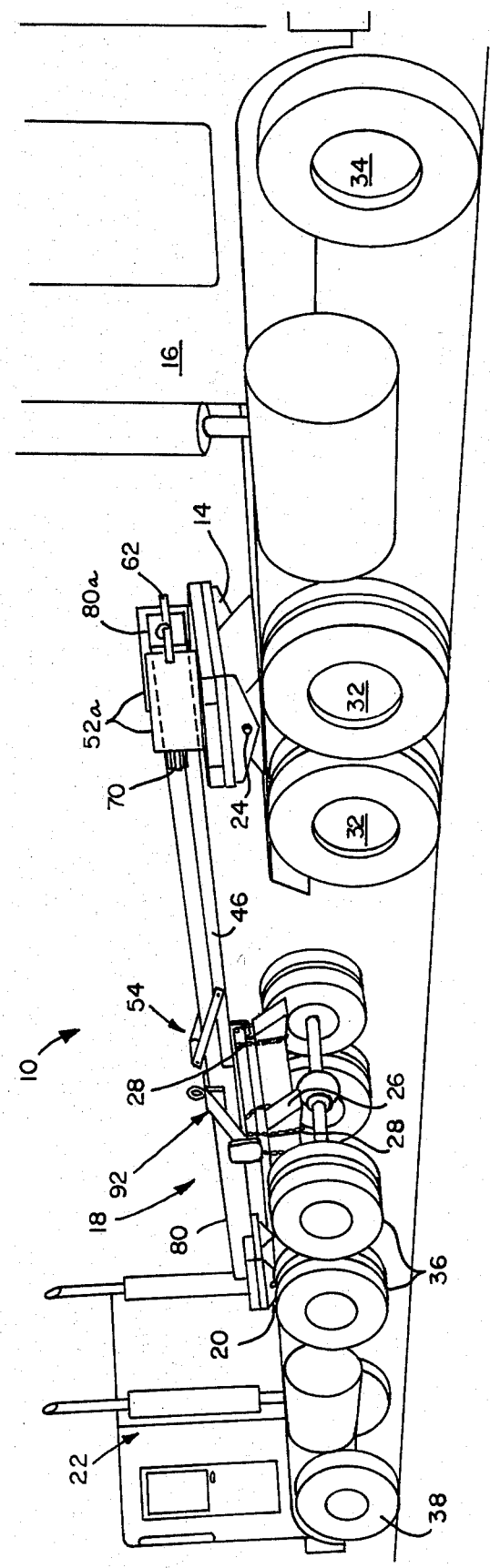
FIG. 1 is a fragmentary, perspective view showing the apparatus of the present invention interconnecting two truck tractors in the towing position.

A towing device constructed in accordance with a preferred embodiment of the invention is illustrated in the drawings and generally designated 10. Basically, towing device 10 includes ramp assembly 12 secured to fifth wheel 14 of towing vehicle 16, and beam assembly 18 connected to fifth wheel 20 of towed vehicle 22. Ramp assembly 12 is pivotal with fifth wheel 14 about fifth wheel pivot axis 24. Beam assembly 18 is maintained in fixed angular orientation to tractor 22 by the interconnection of the beam assembly to towed vehicle frame 26 with chains 28. Beam assembly 18 is slidably supported upon ramp assembly 12.

Figure 2:
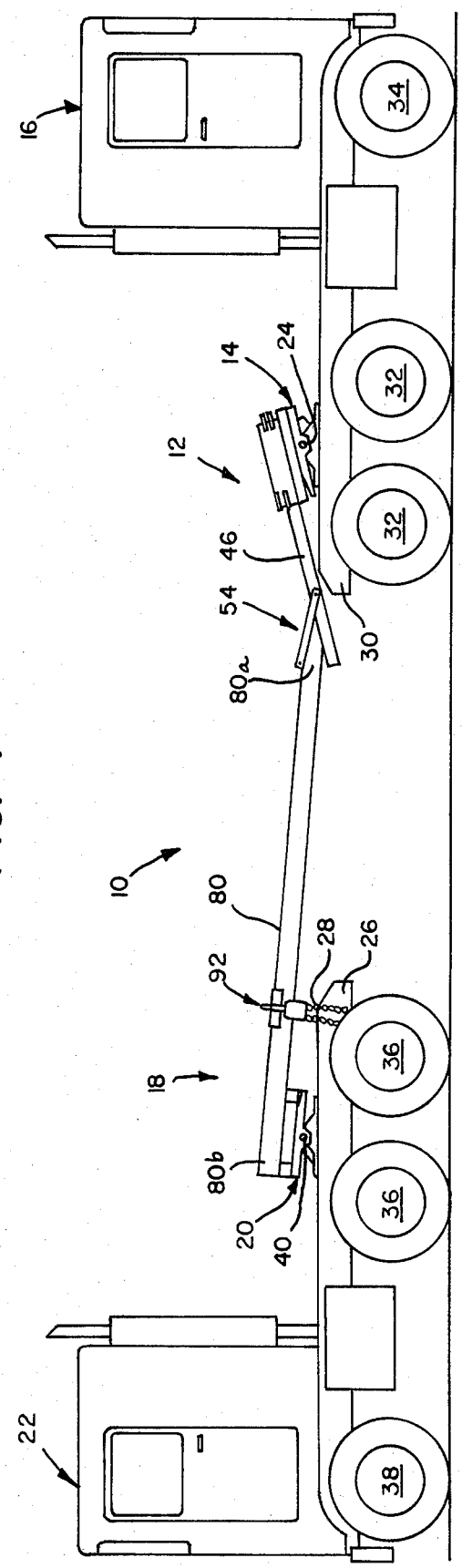
FIG. 2 is a side elevational view similar to FIG. 1 showing the towed tractor in its lowered position.

Device 10 is used by first connecting ramp assembly 12 to towing fifth wheel 14 and connecting beam assembly 18 to towed fifth wheel 20. Chains 28 are wrapped about cradle 92, suspended from beam 80, and frame 26 such that the beam and towed vehicle 22 are interconnected for lifting. Beam assembly 18 is slidably supported upon ramp 12 and is initially positioned as illustrated in FIG. 2. Towed tractor 22 is raised for towing by backing towing vehicle 16 toward towed vehicle 22 causing ramp assembly 12 to lift beam assembly 18 and tractor 22 secured thereto. When towing vehicle 16 is backed into the towing position as illustrated in FIG. 1, a latching mechanism (described below) on ramp assembly 12 securely interconnects the ramp assembly and beam assembly 18 together. Towed tractor 22 is then ready to be towed by towing tractor 16.

Tractors 16 and 22 are generally well known to those having ordinary skill in the art. Suffice it to say that tractors 16 and 22 include frames or chassis 30 and 26, respectively. Towing frame 30 supports rear wheels 32 and front wheels 34, while towed frame 26 supports rear wheels 36 and front wheels 38. Towing frame 30 supports fifth wheel 14 on horizontal pivot axis 24. Similarly, towed frame 26 supports fifth wheel 20 on horizontal pivot axis 40.

Figure 5:
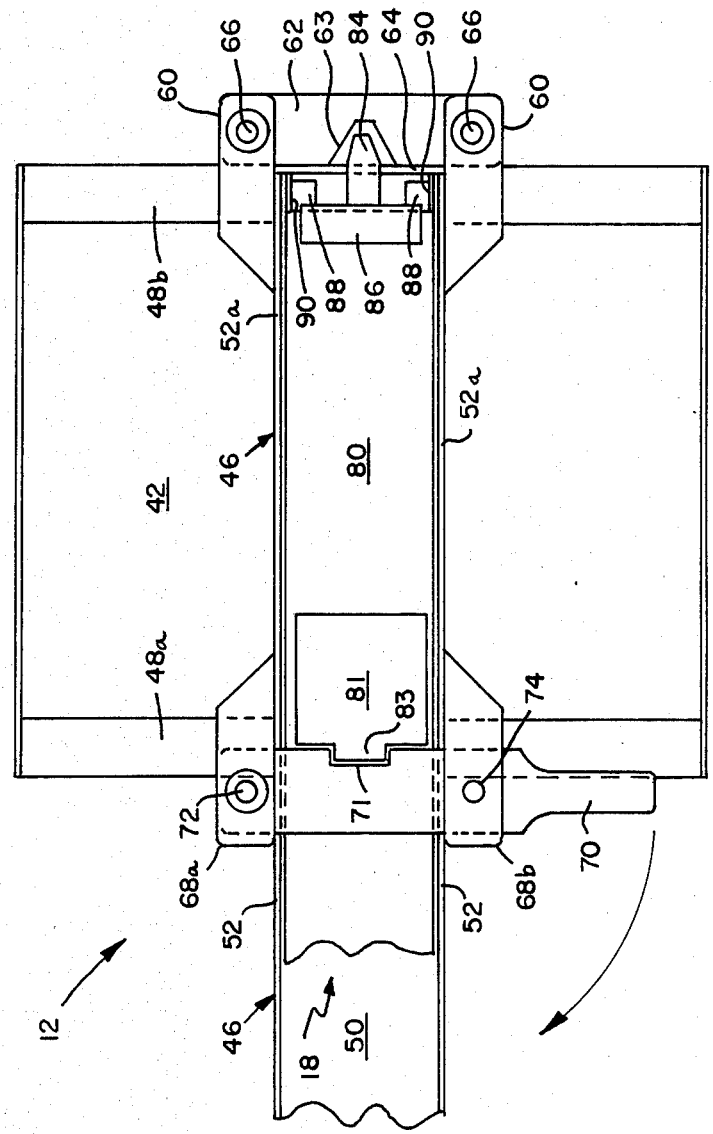
FIG. 5 is a fragmentary top plan view of the ramp kingpin platform.

Turning more specifically to the construction of device 10, ramp assembly 12 (FIGS. 3, 4, and 5) will be first described. Ramp assembly 12 includes fifth wheel platform 42, kingpin 44 extending downwardly therefrom, and ramp 46 fixedly supported thereon (FIGS. 3 and 4). Platform 42 is a generally planar, rectangular sheet of steel plate adapted to overlie fifth wheel 14 (see also FIG. 2). Kingpin 44 is a conventional kingpin and is secured to the underside of platform 42, for example by welding, enabling ramp assembly 12 to be secured to fifth wheel 14. A pair of spaced, parallel crossbars or cross pieces 48a and 48b are secured across the front and rear edges of plate 42. Elongated ramp 46 is secured to crossbars 48a and 48b opposite platform 42 and extend generally perpendicularly thereto. Consequently, ramp 46 pivots with platform 42 on fifth wheel 14 (see also FIG. 2). Ramp 46 is generally trough-shaped throughout its length including planar floor 50 and opposite planar sidewalls 52. Those portions 52a of sidewalls 52 directly above platform 42 are taller than the remainder of sidewalls 52. Forwardmost portion 53 of ramp 46 is located forwardly of kingpin 44 and fifth wheel pivot 24. Consequently, a downward force on forward ramp portion 53, for example exerted by free beam end 80a, causes ramp assembly 12 and fifth wheel 14 to pivot about axis 24 to automatically swing ramp 46 upwardly against beam 80 to a storage or towing position.

Ramp assembly 12 further includes roller support 54. The support includes a pair of side arms 56, one of which is secured to each of opposite ramp sidewalls 52 and a roller 58 rotatably supported therebetween. Roller 58 travels along the upper surface of beam assembly 18 during relative movement of the ramp and beam assemblies.

Each of sidewalls 52a supports a pair of parallel front ears 60 which are generally parallel to platform 42 (FIGS. 3-5) and located above crossbar 48b. Keeper plate 62 including keeper bar 64 welded thereto extends between the ear pairs 60 on the opposite sidewalls 52a and is sandwiched between each ear pair. Pin or bolt 66 extends through ears 60 and keeper plate 62 at each end of the keeper plate to secure the keeper plate in position. Keeper plate 62 defines notch 63 which receives latch 84 and permits the latch to extend about keeper bar 64. Similarly, a pair of parallel rear ears 68 are secured to and extend outwardly from each of sidewalls 52a above crossbar 48a. Paddle-shaped latch bar 70 is sandwiched between ears 68a and is pivotally supported on pin or bolt 72. Consequently, latch bar 70 is pivotable about pin 72 between a latched position illustrated in FIG. 5 and an unlatched position wherein no portion of latch bar 70 is positioned above beam assembly 18. Ears 68b and latch bar 70 define apertures 74 which are aligned when the latch bar is in its latched position enabling a pin (not shown) to be inserted therethrough to secure the bar in position. Latch bar 70 defines cutout or notch 71 in its forward edge to receive plate leg 83.

Figure 6:
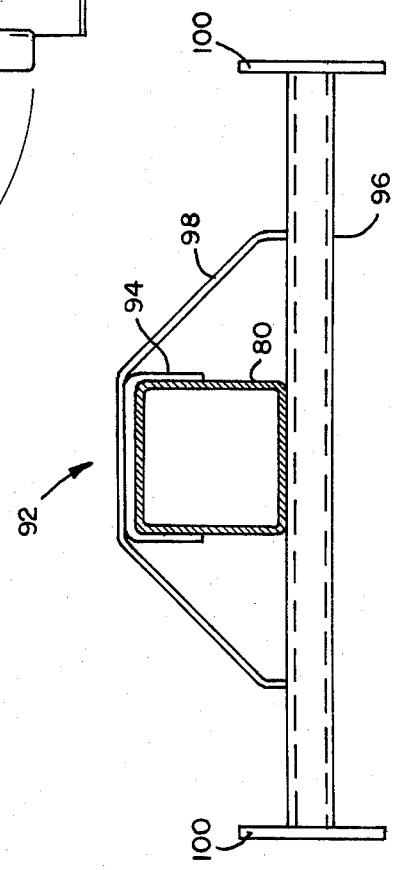
FIG. 6 is a sectional view taken along plane VI—VI in FIG. 4.

Beam assembly 18 is secured to towed vehicle 22 (see FIG. 2). More particularly, beam assembly 18 (FIGS. 3 an 4) includes kingpin platform 76, kingpin 78 secured thereto and extending downwardly therefrom, and beam 80. Platform 76 is a planar, rectangular member to overlie fifth wheel 20 (see also FIG. 2). Kingpin 78 is a conventional kingpin and enables beam assembly 18 to be secured within fifth wheel 20. A pair of spaced, parallel crossbars 82a and 82b overlie and are secured to platform 76 to provide support for beam 80. Beam 80 is an elongated tubular member generally square in cross section (see also FIG. 6) and is secured to cross pieces 82a and 82b and is generally perpendicular thereto. Square lock plate 81 including rearwardly extending leg 83 overlies and is welded to beam 80 to cooperate with latch bar 70 to longitudinally interlock ramp and beam assemblies 12 and 18.

Spring latch 84 (FIGS. 3-5) is supported on remote end 80a of beam 80 to releasably engage keeper bar 64. Spring latch 84 may be any latch generally well known to those having ordinary skill in the art. Suffice it to say that barbed latch 84 latches behind keeper bar 64 when pushed therebeyond and is released by drawing latch 84 upwardly against a spring bias (not shown) enabling beam 80 to be withdrawn from ramp assembly 12. Extending upwardly from beam free end 80a is hook 86, which opens toward opposite beam end 80b and cooperates with roller 58 as illustrated in FIG. 4 to prevent beam 80 from being fully withdrawn from ramp 46. Further at free end 80a, a pair of rollers 88 (FIGS. 3-5) are supported on brackets 90 to rotatably support free beam end 80a on ramp 46. Rollers 88 reduce the friction between beam assembly 18 and ramp assembly 12 during relative movement thereof.

Cradle 92 (FIGS. 4 and 6) is slidably supported on beam 80 and provides a means for interconnecting beam 80 and frame 26 of towed vehicle 22 (see also FIGS. 1 and 2). Cradle 92 includes an inverted U-shaped slide 94 from which is suspended tubular chain bar 96 via strap 98. Enlarged end caps or end plates 100 are secured to the opposite ends of chain bar 96 to prevent the chains from slipping off the chain bar. Finally, hook 102 extends upwardly and forwardly from slide yoke 94 and cooperates with roller 58 as will be described to cantilever beam assembly 18 from ramp assembly 12.

OPERATION

Truck tractors 16 and 22 are rapidly, readily, and securely interconnected using device 10 of the present invention. Ramp assembly 12 is mounted on fifth wheel 14 by inserting kingpin 44 (see also FIG. 3) into the fifth wheel. Beam assembly 18 including beam 80 is secured to fifth wheel 20 by inserting kingpin 78 (see also FIG. 3) into the fifth wheel. Free end 80a of beam 80 is positioned within trough-shaped ramp 46 and roller assembly 54 is positioned on the upper surface of beam 80 to prevent the beam and ramp from becoming separated. Cradle 92 is slid along the length of beam 80 until the cradle is positioned over the rear portion of frame 26.

Chains 28 are wrapped about chain bar 96 of cradle 92 and at least one of frame 26 and the rear axle (not shown) of truck 22 to securely interconnect the beam and the truck. Consequently, upward movement of free end 80a will raise truck 22 about front wheels 38, while downward movement of free end 80a will lower truck 22 about the front wheels. The device as thus far described and installed is illustrated in FIG. 2.

Prior to lifting truck 22 into the towing position, latch bar 70 (FIG. 5) is pivoted to its open position to clear the way for beam 80 to enter between elevated walls 52a of ramp 46. Towed tractor 22 is lifted into the towing position by backing towing tractor 16 toward the towed tractor. As tractor 16 moves backward, ramp 46 passes under beam 80, and free end 80a travels upwardly along ramp 46 on rollers 88 to lift towed truck 22 about front wheels 38. As the ramp assembly 12 and beam assembly 18 move relative one another, roller 58 of roller support 54 travels along the upper surface of beam 80. When beam end 80a and rollers 88 pass forwardly of fifth wheel pivot axis 24, fifth wheel 14 pivots thereabout and swings ramp 46 upwardly against beam 80 such that the two are generally parallel as illustrated in FIGS. 1 and 3. Spring latch 84 latches about keeper bar 64 to prevent relative axial movement of the two elongated members 46 and 80. Assemblies 12 and 18 are secured together by pivoting latch bar 70 to the latched position illustrated in FIG. 5. The latch bar is secured in this position by inserting a pin (not shown) through aligned apertures 74 in ears 68b and the latch bar. At this point, tractors 16 and 22 are properly interconnected for towing with towed vehicle 22 resting only on front wheels 38.

Tractors 16 and 22 are released by reversing the above described steps and withdrawing ramp 46 from under free end 80a to the position illustrated in FIG. 2. The engagement of roller support 54 with hook 86 on beam free end 80a prevents ramp 46 from being fully withdrawn from beam 80, which would result in the beam dropping to the ground.

Although not illustrated in the drawings, beam assembly 18 can be cantilevered from ramp assembly 12 to facilitate the removal of the device from towed tractor 22 and reinstallation on another vehicle to be towed at the same location. This cantilevering is not to be used for transporting towing device 10 over long distances. Beam assembly 18 is so cantilevered by sliding cradle 92 along beam 80 when the beam is in the position illustrated in FIGS. 2 and 4 until cradle hook 102 is positioned about roller 58 of roller support 54. A drawing means such as a come-along is then secured between cradle 92 and a portion of ramp assembly 12 opposite roller support 54 from beam 80. For example, one suitable portion would be either of sidewall portions 52a.

Towing device 10 is prepared for long distance transportation on a single tractor 16 by "bob-tailing" or shifting beam assembly 18 forwardly in ramp assembly 12 to a position not illustrated in the drawings. More specifically beam 80 is slid forwardly within ramp 46 until free end 80a is proximate cab 17 of towing vehicle 16. Keeper plate 62 must first be pivoted out of alignment with ramp 46 by removing one of pins 66 and pivoting the keeper plate about the other pin 66. After beam 80 is properly shifted as described, chains 28 are used to secure one or both of beam ends 80a and 80b to tractor frame 30. In one preferred position, ramp 46 extends through cradle 92 and engages cross member 82b of beam assembly 18.

Beam 80 could be fixedly secured to disabled vehicle 22 in a variety of ways. For example, one contemplated construction would be to secure the beam under the vehicle chassis with the beam extending forwardly from the vehicle whereby the towing and towed vehicle would be in back-to-front relationship instead of back-to-back relationship as described. Ramp 46 could be pivotally connected to the towing vehicle also in a variety of ways.

The above description is that of a preferred embodiment of the invention. Various changes and alterations can be made without departing from the spirit and broader aspects of the invention as set forth in the claims which are to be interpreted in accordance with the principles of patent law, including the doctrine of equivalents.

The embodiments of the invention in which an exclusive property or privilege is claimed are defined as follows:

1. A towing apparatus for interconnecting two truck tractors enabling one tractor to tow the other tractor, each of the tractors including a hinged fifth wheel, said apparatus comprising:
   a beam assembly including an elongated beam and a kingpin for securing said beam assembly to the towed tractor fifth wheel, said beam assembly further including means for securing said beam to the towed tractor at a location remote from the fifth wheel to fixedly secure said beam to the towed tractor, said beam extending rearwardly and downwardly from the tractor and terminating in a free end;
   a ramp assembly including an elongated ramp and a kingpin for securing said ramp assembly to the towing tractor fifth wheel for pivotal movement therewith, said ramp extending rearwardly and downwardly from the fifth wheel, said ramp supporting said free beam end for sliding movement therealong, whereby the rear wheels of the towed tractor can be lifted by backing the towing tractor toward said towed tractor causing said beam assembly and towed tractor to be lifted by said ramp assembly; and
   interlock means for preventing said beam and ramp from becoming disengaged.

2. A towing apparatus as defined in claim 1 further comprising roller means for rotatably supporting said free beam end on said ramp.

3. A towing apparatus as defined in claim 2 wherein said ramp includes a forward portion located forwardly of the towing tractor fifth wheel pivot axis, whereby said ramp will automatically pivot upwardly toward said beam to a stowage position when said beam free end is located on said ramp portion.

4. A towing apparatus as defined in claim 3 further comprising locking means for longitudinally interlocking said beam and said ramp in a towing position.

5. A towing apparatus as defined in claim 1 further comprising locking means for longitudinally interlocking said beam and said ramp in a towing position.

6. A towing apparatus as defined in claim 1 wherein said ramp includes a forward portion located forwardly of the towing tractor fifth wheel pivot axis, whereby said ramp will automatically pivot upwardly toward said beam to a stowage position when said beam free end is located on said ramp portion.

7. An apparatus for interconnecting two truck tractors enabling one truck tractor to tow the other truck tractor, said apparatus comprising:

an elongated beam member fixedly secured to the towed vehicle, said beam member including a remote end extending from the vehicle;

an elongated ramp member secured to the towing vehicle, said ramp member slidably interengaging said remote beam end, said ramp member extending outwardly and downwardly from the towing vehicle, whereby movement of the towing vehicle toward the towed vehicle lifts said remote beam end and the towed vehicle, and whereby movement of the towing vehicle away from the towed vehicle lowers said remote beam end and the towed vehicle; and interlock means for preventing said beam member from being fully withdrawn from said ramp member.

8. An apparatus as defined in claim 7 wherein the towing vehicle includes a fifth wheel, and wherein said apparatus comprises kingpin means for securing said ramp member to the towing vehicle fifth wheel.

9. An apparatus as defined in claim 8 wherein said ramp member includes a forward section forwardly of the fifth wheel pivot axis, whereby movement of said remote beam end to said section causes the remainder of said ramp member to automatically pivot upwardly against said beam member to assume a towing position.

10. An apparatus as defined in claim 9 further comprising lock means for interlocking said ramp member and said beam member in said towing position.

11. An apparatus as defined in claim 10 further comprising roller means for rotatably supporting said free beam end on said ramp member.

12. An apparatus as defined in claim 7 further comprising roller means for rotatably supporting said free beam end on said ramp member.

13. A method of interconnecting two truck tractors for towing, said method comprising:

securing a ramp member to the towing tractor, the ramp member extending rearwardly and downwardly from the towing tractor;

securing a beam member to the towed tractor;

positioning the ramp member under the beam;

preventing the beam member from being fully withdrawn from the ramp member; and backing the towing tractor toward the towed tractor, forcing the ramp under the beam, causing the free beam end to travel upwardly along the ramp to lift the towed tractor for towing.

14. A method as defined in claim 13 wherein said positioning step comprises rotatably supporting the beam on the ramp member.

* * * * *